(12) United States Patent
Cepynsky et al.

(10) Patent No.: US 9,931,938 B2
(45) Date of Patent: Apr. 3, 2018

(54) VEHICLE BATTERY RELAY ASSEMBLY

(71) Applicants: George L. Cepynsky, Lisle, IL (US); Paul G. Cepynsky, Lisle, IL (US); Thomas J. Danowski, Schaumburg, IL (US)

(72) Inventors: George L. Cepynsky, Lisle, IL (US); Paul G. Cepynsky, Lisle, IL (US); Thomas J. Danowski, Schaumburg, IL (US)

(73) Assignee: Precision Circuits Inc., Downers Grove, IL (US)

( * ) Notice: Subject to any disclaimer, the term of this patent is extended or adjusted under 35 U.S.C. 154(b) by 409 days.

(21) Appl. No.: 14/826,479

(22) Filed: Aug. 14, 2015

(65) Prior Publication Data

US 2016/0152140 A1    Jun. 2, 2016

Related U.S. Application Data

(60) Provisional application No. 62/085,745, filed on Dec. 1, 2014.

(51) Int. Cl.
*B60L 3/00* (2006.01)
*B60L 11/18* (2006.01)

(52) U.S. Cl.
CPC ........... *B60L 3/00* (2013.01); *B60L 3/0069* (2013.01); *B60L 11/1859* (2013.01); *B60L 11/1879* (2013.01); *Y02T 10/7005* (2013.01); *Y02T 10/705* (2013.01)

(58) Field of Classification Search
CPC .... B60L 3/00; B60L 11/1879; B60L 11/1859; B60L 3/0069; Y02T 10/705; Y02T 10/7005
See application file for complete search history.

(56) References Cited

U.S. PATENT DOCUMENTS

2011/0202263 A1\* 8/2011 Kawazu ............. F02N 11/0848
701/113

\* cited by examiner

*Primary Examiner* — Jared Fureman
*Assistant Examiner* — Win Htun
(74) *Attorney, Agent, or Firm* — Schiff Hardin LLP

(57) ABSTRACT

In a vehicle battery relay assembly for disconnecting or isolating a vehicle battery from a connection line, a housing is provided having a solenoid and a switch activated by the solenoid. The switch electrically connects and disconnects a first contact terminal for connection to the vehicle battery and a second contact terminal for connection to the connection line. The solenoid has a solenoid coil. A rotatable ratchet gear rotates by engagement with a pawl, the pawl being connected to a plunger of the solenoid. The switch comprises a contact element coupled to the ratchet gear, the contact element having at least first and second projecting contact points. The contact element is positioned relative to a contact surface of the first and second contact terminals such that given a first rotation of the contact element the first and second contact terminals are electrically connected and given a subsequent second rotation the first and second contact terminals are electrically disconnected.

22 Claims, 6 Drawing Sheets

VEHICLE BATTERY RELAY ASSEMBLY

CROSS-REFERENCE TO RELATED APPLICATION

This application claims the benefit of U.S. Provisional Patent Application titled "IMPROVED VEHICLE BATTERY RELAY ASSEMBLY" U.S. Ser. No. 62/085,745, filed Dec. 1, 2014, which is incorporated herein by reference.

BACKGROUND

In vehicles powered by a vehicle battery it is frequently necessary to provide a high current battery relay for disconnecting the vehicle battery from a vehicle load powered by the vehicle battery. It is also useful to isolate a vehicle battery from another vehicle battery.

In view of high switching currents it has been a problem in the prior art to provide a reliable battery relay for switching such high vehicle battery currents while at the same time providing reduced wear and increased life cycle of the battery relay.

With such prior art battery relays it has been known to employ rotary contact type relays which are driven by motors which are slow to operate and can cause arcing. It is also known to provide solenoid operated relays where the contacts move linearly to make and break contact (for example a starter relay).

Traditional prior art ratchet and pawl assemblies are normally flat and have pointed teeth or gears for motion, which increases friction, wear, and force on a small surface.

SUMMARY

It is an object to decrease the size of a typical battery relay for switching high currents, reduce the force required to accomplish the switching function without increased arcing and thereby reduce the cost, increase the reliability and the life cycle, and to reduce wear for switching high currents from a vehicle battery when the battery is disconnected from the vehicle load or when the vehicle battery is isolated from another vehicle battery.

In a vehicle battery relay assembly for disconnecting or isolating a vehicle battery from a connection line, a housing is provided having a solenoid and a switch activated by the solenoid. The switch electrically connects and disconnects a first contact terminal for connection to the vehicle battery and a second contact terminal for connection to the connection line. The solenoid has a solenoid coil. A rotatable ratchet gear rotates by engagement with a pawl, the pawl being connected to a plunger of the solenoid. The switch comprises a contact element coupled to the ratchet gear, the contact element having at least first and second projecting contact points. The contact element is positioned relative to a contact surface of the first and second contact terminals such that given a first rotation of the contact element the first and second contact terminals are electrically connected and given a subsequent second rotation the first and second contact terminals are electrically disconnected.

DESCRIPTION OF EXEMPLARY EMBODIMENTS

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

Figure 1:
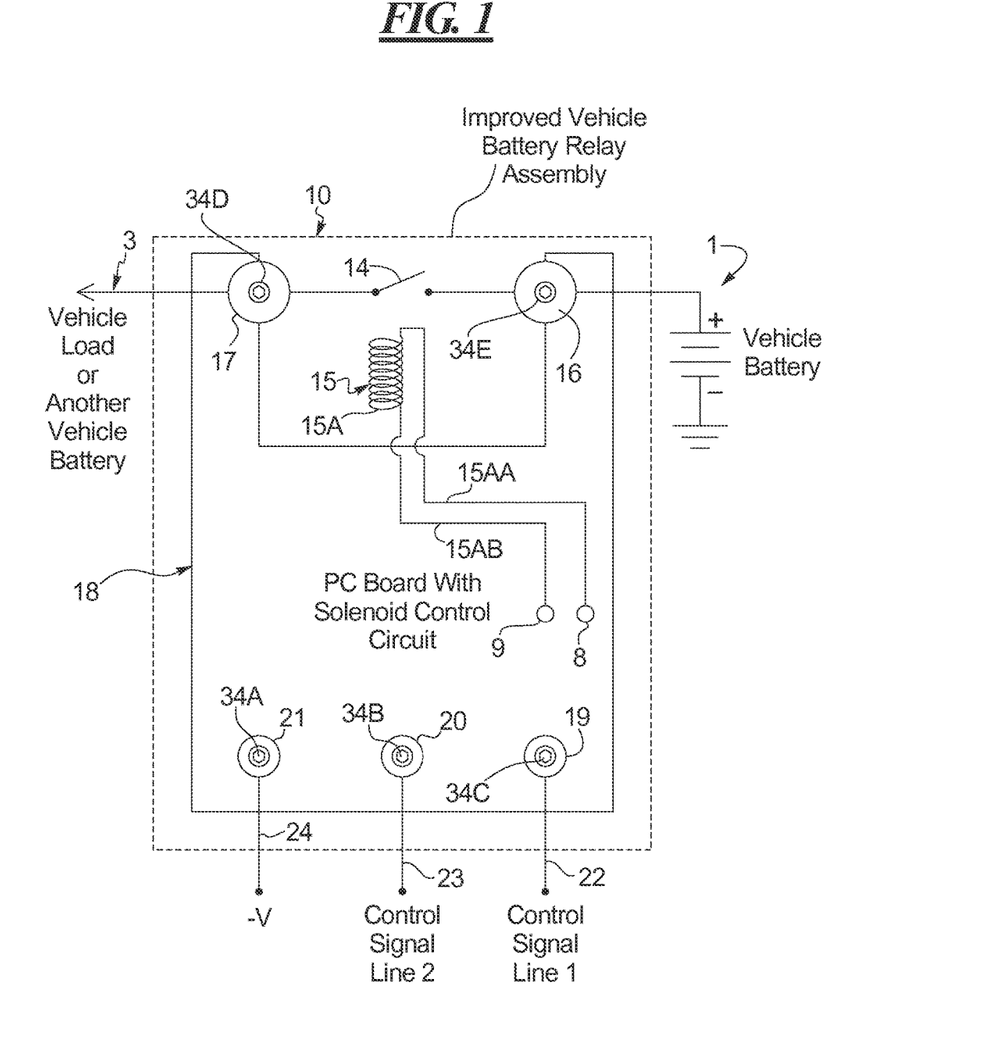
FIG. 1 is a schematic diagram illustrating the improved vehicle battery relay assembly employed for switching high currents from a vehicle battery to a vehicle load during battery disconnect or isolation from another vehicle battery.

As shown in FIG. 1, a vehicle battery 1 is to be disconnected from a connection lead 3 connected to a vehicle load or to another vehicle battery. An improved vehicle battery relay assembly 10 comprises a switch formed of a contact washer 14 activated by solenoid 15. The switch formed as the contact washer 14 is connected at one side to a contact bolt 16 having respective screw 34E connected to the vehicle battery 1 and at the opposite side to a contact bolt 17 having respective screw 34D connected to the lead 3.

A PC board 18 having a solenoid control circuit thereon is provided. Battery power for the control circuit is provided by contact bolt 16 with respective screw 34E. The solenoid coil 15A of the solenoid 15 has lead wires 15AA and 15AB which are directly soldered at their respective ends to PC board 18 at termination holes 8 and 9 also shown in FIG. 4A. The control circuit PC board 18 has an input control signal line 1 shown by reference numeral 22 connecting at terminal screw 19 having respective screw 34C and input control signal line 2 shown by reference numeral 23 connecting at terminal screw 20 having respective screw 34B. A −V line 24 connects to terminal screw 21 having respective screw 34A. It is understood that −V may be the vehicle ground, but not necessarily.

The PC board control circuit may have various configurations, depending on desired function and/or use. For example when the relay assembly is to function as a remote manual battery disconnect relay, the circuit on the PC board 18 is configured to allow remote disconnect of the vehicle battery from the vehicle electrical system functioning as the load. For the battery disconnect, with low voltage sensing the vehicle battery 1 can be automatically disconnected from the vehicle electrical system when the ignition is off, to prevent the battery from being drained (for example headlights accidently having been left on). As a third configuration the relay assembly can operate as either a manual battery disconnect or low voltage sensing automatic disconnect depending on user selections input on the control signal lines 1 and 2 shown at 22 and 23. As a battery isolation relay between two separate vehicle battery systems, the assembly 10 connects the two separate battery systems together when either battery is being charged, and can isolate the two electrical systems to prevent draining battery 1 by the second system.

Figure 2:
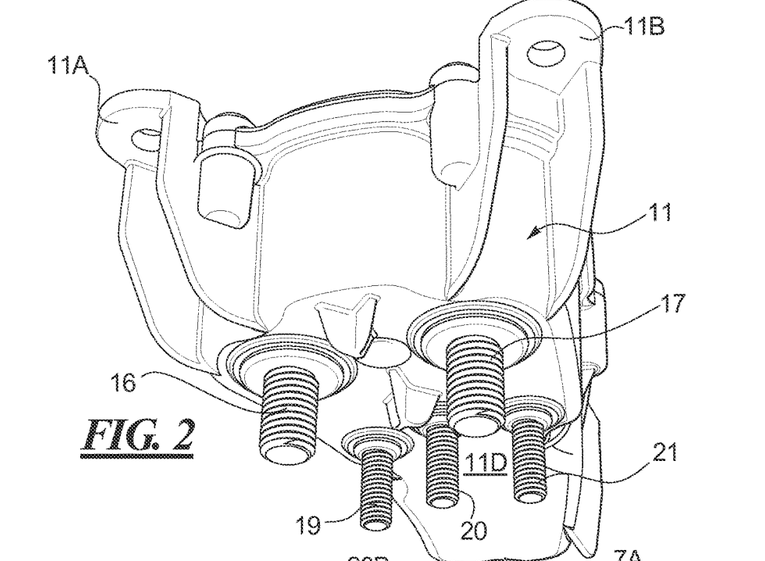
FIG. 2 is a perspective view from beneath a housing of the improved vehicle battery relay assembly.
Figure 3:
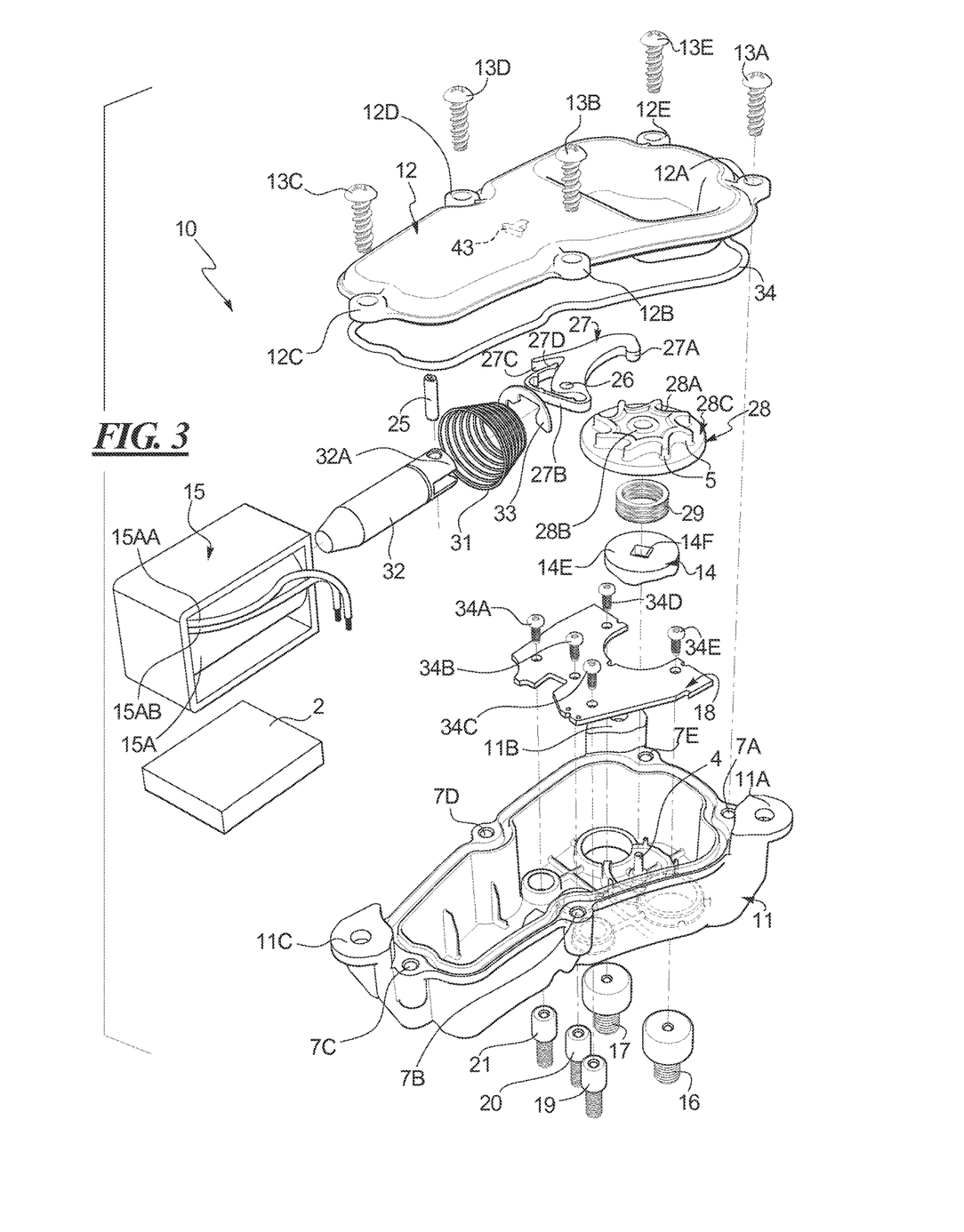
FIG. 3 is an exploded perspective view showing various components employed in the improved vehicle battery relay assembly.
Figure 4A:
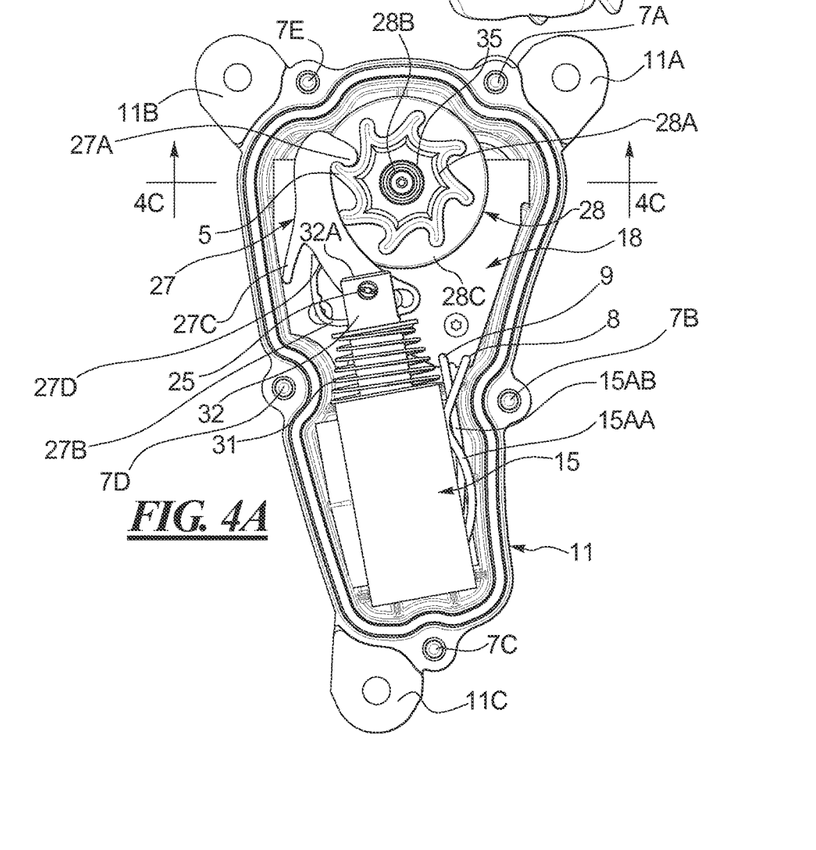
FIG. 4A is a top view of the improved vehicle battery relay assembly with a housing base removed and the solenoid coil shown in an inactive state with the plunger released.

As shown in FIG. 2, FIG. 3, and FIG. 4A, the assembly includes a housing 11 having housing base 12 and mounting ears 11A, 11B, and 11C for mounting the housing to a mounting surface not shown. On a terminal surface 11D (see FIG. 2) the contact bolts 16 and 17, and the terminal screws 19, 20, and 21 are incorporated, such as by insert molding into the housing.

As shown in the perspective exploded view of FIG. 3, the assembly 10 has the housing 11 and the base 12 connected thereto by phillips head screws 13A, 13B, 13C, 13D and 13E received in mounting holes 7A, 7B, 7C, 7D and 7E. The housing base 12 has aperture mounting projections 12A, 12B, 12C, 12D and 12E for receiving the mounting screws 13A, 13B, 13C, 13D, and 13E therethrough.

Figure 4B:
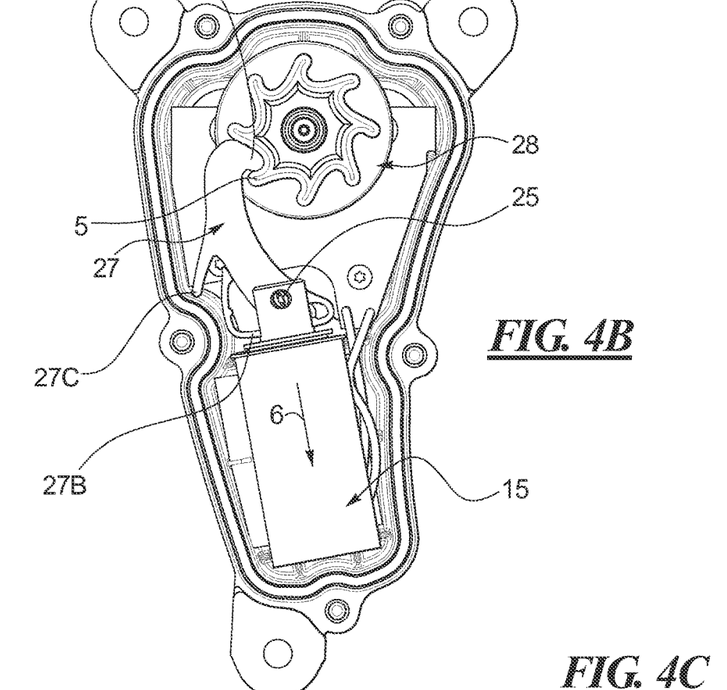
FIG. 4B is a top view of the improved vehicle battery relay assembly with a housing base removed and the solenoid coil shown in an active state with the plunger drown into the solenoid coil.
Figure 4C:
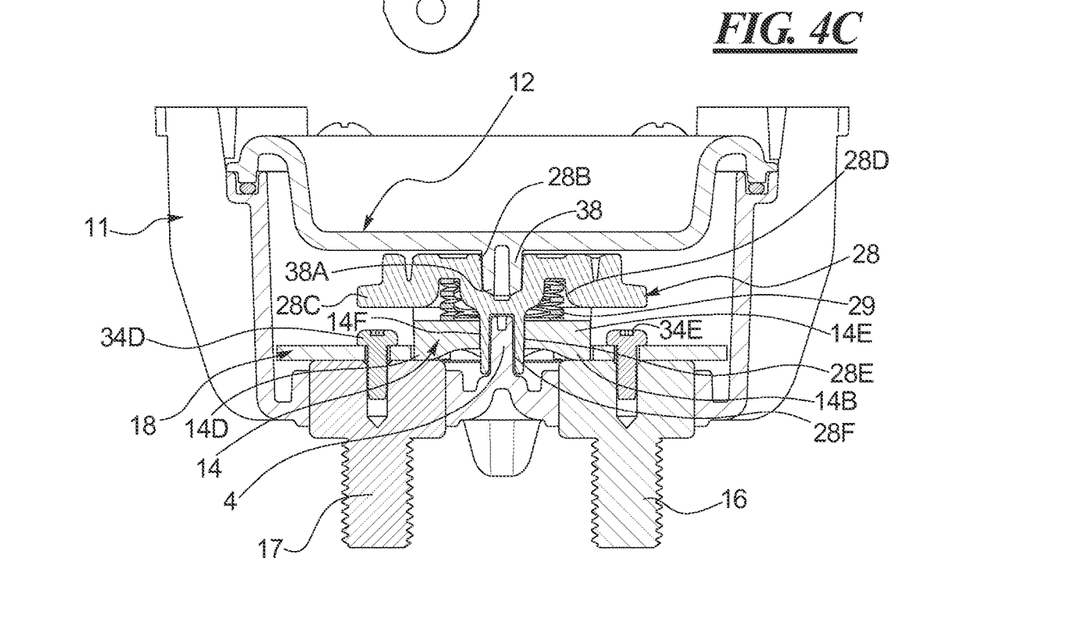
FIG. 4C is a section view along section line 4C-4C in FIG. 4A and showing the ratchet gear mounting in greater detail.

As shown in FIG. 4C a circular pin 38 protruding from an inner surface of base 12 is received in a circular pocket 28B of ratchet gear 28 to thus provide a top circular pivot point for the ratchet gear 28. Pin 38 has a conical shaped end 38A which matches a conical shaped end of pocket 28B. These cooperating conical shaped surfaces ensure the ratchet gear 28 remains on center as it rotates about pin 38. The ratchet gear 28 has extending downwardly therefrom a square shank 28E which is integral to the ratchet gear 28 and has a circular pivot hole 28F up inside the square shank 28E (see FIG. 4C) which sits on a circular pin 4 in housing 11 described hereafter with respect to FIG. 7 as another pivot point allowing circular rotation of the ratchet gear 28.

As shown in FIG. 3, beneath the housing base 12 is illustrated a pawl 27 rotatable about retention pin 25 received through a pivot aperture 26 of pawl 27. Pawl 27 has a pawl head 27A, spring member 27B with an end face 27D, and pawl stop 27C. The pawl head 27A engages in grooves 28A between teeth 5 of the ratchet gear 28. Teeth 5 are adjacent a disc 28C. Disc 28C of the ratchet gear 28 has an annular pocket 28D (see FIG. 4C) receiving therein a compression spring 29 followed by the contact washer 14 functioning as the previously described switch contact element.

Solenoid 15 comprises a solenoid coil 15A with the solenoid leads 15AA and 15AB. The solenoid further comprises a return spring 31, plunger 32, and retention ring 33. A foam pad 2 is provided adjacent solenoid 15 for cushioning the solenoid 15.

The previously described screws 34A-34E are torx-drive pan head retention screws and mount the PC board 18 in the housing and establish electrical contact to the control circuit on the PC board.

Beneath the PC board 18 are provided the contact bolts 16 and 17 and the terminal screws 19, 20, and 21.

A sealing member 34 is provided for sealing between the housing base 12 and the housing 11.

In the top view of FIG. 4A with the housing base 12 removed one can see in plain view the arrangement of the various components described previously.

Figure 5:
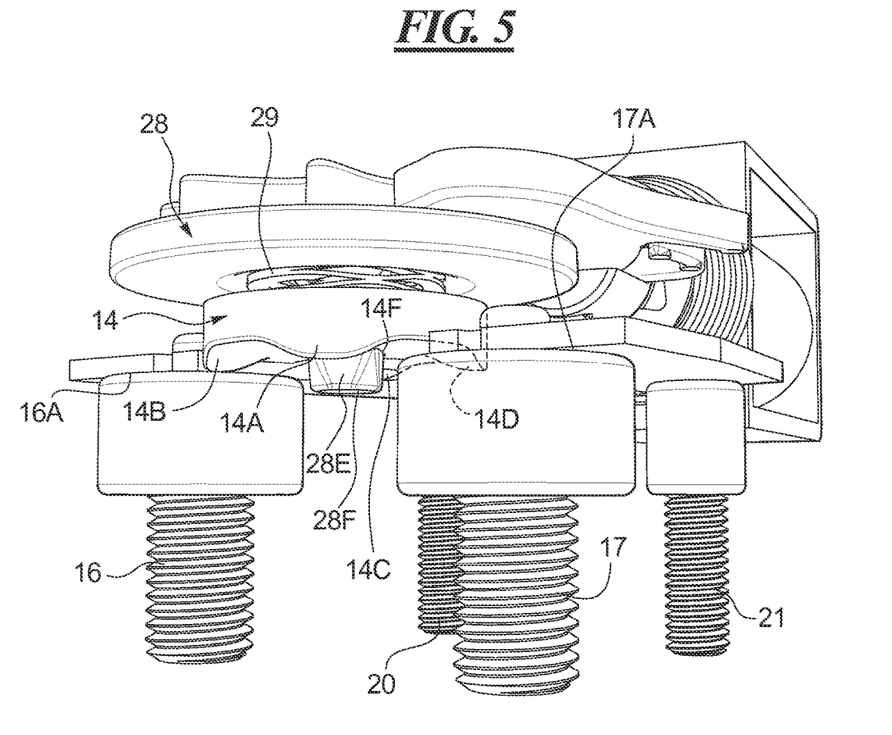
FIG. 5 is a perspective view of terminal and switch components of the assembly of FIG. 1.

Referring to the perspective view of FIG. 5, the terminal screws 19, 20, and 21 and contact bolts 16 and 17 together with switch element contact washer 14 are illustrated. One may observe how the circular contact washer 14 functions for establishing an electrical connect and disconnect between a top end contact surface 16A and 17A of the contact bolts 16 and 17 by use of protruding contact points 14A, B, C, and D formed as downwardly protruding bumps from a main body 14E of the washer (see also FIG. 6). The ratchet gear 28 is integral with the square shank 28E. This square shank 28E protrudes downwardly through a square aperture 14F in the main body 14E of the contact washer 14 and has the circular pivot hole 28F at a bottom thereof (see FIG. 4C).

Figure 6:
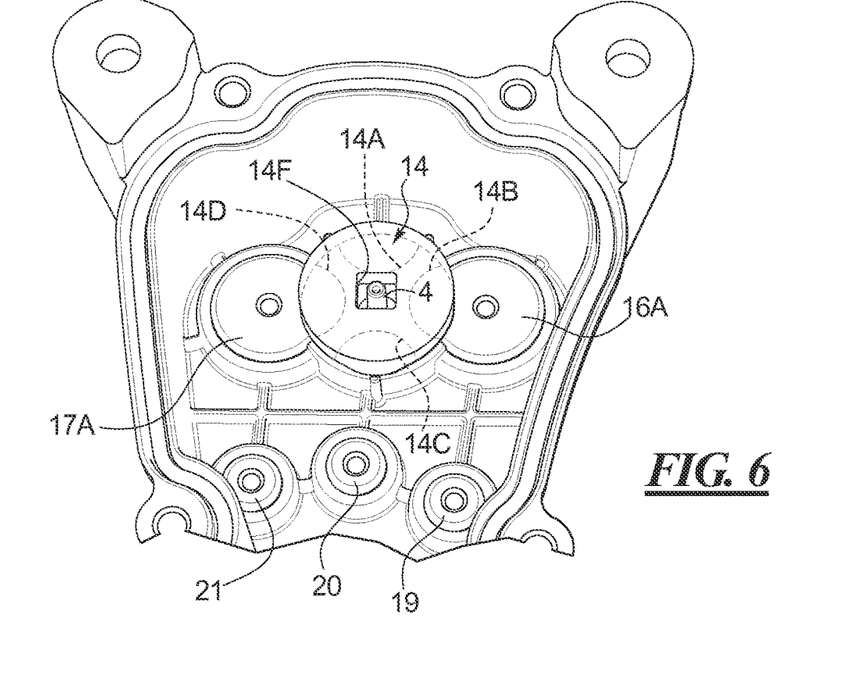
FIG. 6 is a top partial perspective view of terminal and switch components of the assembly of FIG. 1 including a contact washer.

In FIG. 6 one may observe in the partial perspective view how the contact washer 14 with its contact points 14A-D as bumps is positioned relative to the top end contact surface 16A or 17A of the contact bolts 16 and 17.

Figure 7:
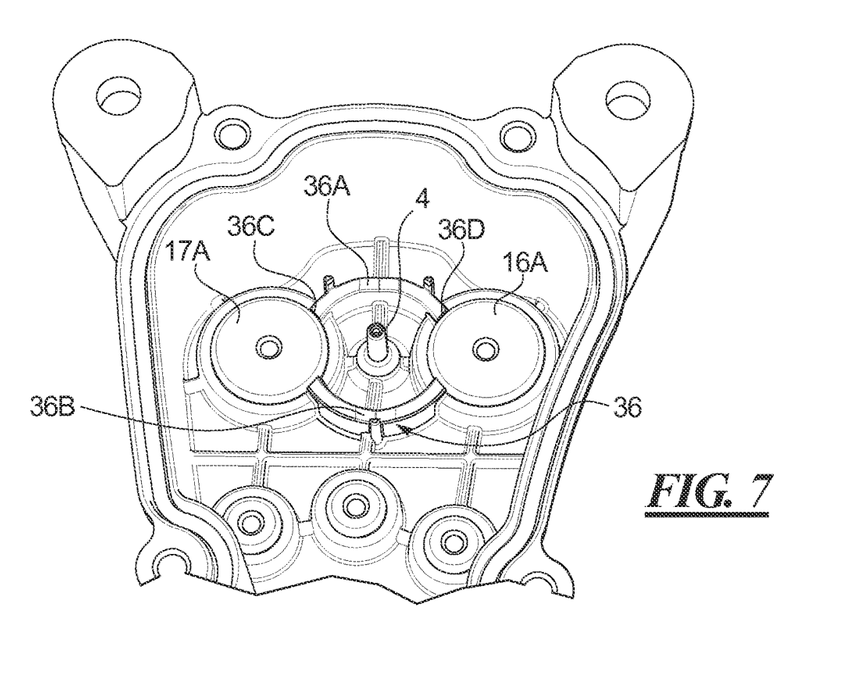
FIG. 7 is a top partial perspective view of the terminal and switch components in FIG. 6 but with the contact washer removed for viewing clarity.

In FIG. 7 the contact washer 14 has been removed and one may observe a housing plastic ring 36 having V-grooves at 36A, B and circular cut-outs 36C and 36D conforming to a periphery of a respective head forming the top end contact surface 16A or 17A of the contact bolts 16 and 17.

Further details and explanations will now be provided concerning various components of the assembly. The contact bolts 16, 17 are copper and the terminal screws 19, 20, and 21 are steel, all custom cold-headed with holes in a center of the head of the bolts and of the screws, respectively. They are insert molded into the housing in such a way that the heads of all the bolts and screws will be on a same plane. The printed circuit board 18 rests on a common plane of the heads of the terminal bolts 16, 17 and the terminal screws 19, 20, and 21. The printed circuit board mounting screws 34A-E self-thread into holes in heads of the contact bolts 16, 17 and terminal screws 19, 20, and 21 and provide an electrical connection from the printed circuit board to outside of the housing and mechanically secure the printed circuit board inside the housing.

When voltage is applied to the solenoid coil 15A, magnetic force pulls the plunger 32 (shown in FIG. 4A not yet pulled in) inside and down as shown in FIG. 4B. The downward motion is indicated by arrow 6 in FIG. 4B. As shown in FIGS. 4A and 4B, the plunger 32 pulls the pawl 27 since it is linked thereto by the retention pin 25. The pawl in turn grabs a tooth 5 as illustrated in FIG. 4A of the ratchet gear 28 converting linear motion into rotary motion and spinning the ratchet gear by 45° as shown in FIG. 4B. The housing base 12 as shown in FIG. 3 provides one pivot point as the pivot pin 38 is received in the circular pocket 28B of the ratchet gear 28. The ratchet gear 28 also has the circular pivot hole 28F on the other side as shown in FIG. 4C which receives the housing circular pin 4. As the plunger 32 reaches its end of travel and bottoms inside the solenoid 15, pawl stop 27C (see FIG. 4B) touches an inside surface of the side of housing 11, preventing pawl 27 from moving sideways, and insuring that the pawl head 27A stays engaged with the ratchet teeth 5, thus preventing the ratchet gear 28 from over spinning. This stop mechanism assures that the contacts 14A-14D on washer 14 stop consistently at the appropriate position. When power to the solenoid coil 15A is removed the plunger 32 and pawl 27 are moved away from the solenoid coil 15A by the return spring 31 until the plunger end surface 32A impacts a stop rib 43 located on a bottom side of the housing base 12 shown in dashed lines in FIG. 3, thus positioning plunger 32 and the pawl 27 into a rest position allowing it to grab a next tooth 5 on the ratchet gear 28 on a next actuation of the solenoid coil 15.

The pawl 27 has an integral spring member 27B with the end face 27D (see FIGS. 3 and 4A) which keeps the pawl spring loaded against the teeth 5 of the ratchet gear 28. One side of the spring member 27B is integral to the pawl 27 and provides the initial bending spring force. On the other side of the spring member there exists the end face 27D which initially moves freely with the spring member 27B, and then makes contact and slides along the main body of the pawl 27. This contact provides an increased spring force, providing a two-step spring force through the rotational travel of the pawl 27 about the pin 25.

As shown in FIG. 3, during an assembly process the housing base 12 is screwed down to the housing 11. The housing base 12 pushes on the ratchet gear 28, compressing the compression spring 29, which in turn provides constant contact pressure to the contact washer 14. The contact washer 14 rotates and can move vertically on square shank 28E of ratchet gear 28 to compensate for surface wear and also to permit constant pressure by virtue of the compression spring 29 to contact bolts 16 and 17. During a single rotation, the contact washer does not move vertically. It only slides from contact bolts 16 and 17 to contact ring 36, thus maintaining contact compression height of compression spring 29 and constant spring force throughout 360° of rotation.

As shown in FIG. 5, the ratchet gear 28 has the square shank 28E which fits into the square aperture 14F in the contact washer 14. As the pawl 27 rotates the ratchet gear 28, the ratchet gear integral with the square shank 28E also rotates the contact washer 14.

The contact washer 14 as previously described has the four contact points 14A, B, C, D shaped as projecting bumps. These points are located at 90° positions. Each time the solenoid 15 is operated with a voltage, the contact washer 14 spins 45°. As shown in FIG. 6, in one rotational position two opposing contact points 14B and 14D for example make a connection between the top end contact surfaces 16A, 17A of two contact bolts 16, 17. In the next rotation position none of the four contact points are touching the contact bolt top end contact surfaces and the circuit is open. The housing plastic ring 36 as illustrated in FIG. 7 is provided on which the contact points 14A-D ride when not touching the contact bolts 16, 17. This ensures that the contact washer 14 does not move up and down the square shank 28E of ratchet gear 28. In this way the amount the compression spring 29 is compressed does not change and the force remains constant. The solenoid force only needs to rotate the contact washer 14 and does not need to work the compression spring 29, thereby reducing a total force required, and the associated size of the solenoid required to produce the force. Using a solenoid is important in that the motion is quick, and thus the open and closing of the contact is quick, thus reducing arcing associated with slow switching speeds.

As illustrated in FIGS. 6 and 7, the housing plastic ring 36 design ensures that the contact points 14A, B, C, D of the contact washer 14 slide on and off the contact bolts 16 and 17, and the V-shape grooves 36A, B in the plastic ring 36 ensure when one opposing pair of contact points are sitting on the top end contact surfaces 16A, 17A of the contact bolts 16, 17 such as contact points 14B, 14D in FIG. 6 the other opposing pair of contact points 14A, 14C are hanging in free air, thus ensuring all spring 29 force is transferred to a contact force between the contact points 14B, 14D and the top end contact surfaces 16A, 17A of the contact bolts 16 and 17.

From a mechanical stand point, the rotary motion contact washer 14 is powered by the linear motion solenoid 15. The plastic pawl 27 incorporates the spring member 27B to push the pawl head 27A against the ratchet teeth 5.

The ratchet gear 28 and the pawl 27 are not orientation/gravity dependent due to the live spring member 27B for operation. This is all accomplished by having all the components needed for that incorporated into one—the pawl 27.

By using a linear solenoid with a pawl and ratchet mechanism to convert linear motion to rotary motion, the contact can be moved quickly resulting in nearly an instantaneous contact versus the slower rotary motor/gear mechanism. As a result the opportunity for arcing is greatly reduced. Also utilizing a rotary contact configuration allows for a constant spring contact force versus the linear motion contact which has to develop the contact force each time the solenoid is energized.

The ratchet gear 28 and pawl 27 design has an organic shape to it. Traditional ratchets and pawls are normally flat and have pointed teeth or gears for motion increasing the friction, wear, and force on a small surface. The present design has a large bearing surface that more imitates a bearing and distributes the force over the entire face, thus reducing wear and increasing life cycle.

From an electrical standpoint the assembly of the preferred embodiment has the following advantages. The printed circuit board 18 is incorporated inside the housing 11 together with the solenoid 15 and contacts. Furthermore, the printed circuit board 18 is attached to screws which are insert molded in plastic to permit connection to external control. The screws are fabricated with a hole in the center of the respective heads so that the printed circuit board will lay flat against all the heads and make electrical connection.

The control circuit on the printed circuit board prevents the solenoid coil 15A from overheating or failing by providing overcurrent protection of the solenoid coil. Also there is a time to limit operation of the solenoid coil. By providing these electronics on the printed circuit board these features are done internally of the assembly.

Since the printed circuit board 18 is placed inside the housing 11 of the assembly, the assembly can perform different functions. For example, as previously described, the assembly can be a battery disconnect to allow remote manual disconnect of the vehicle battery from the vehicle electrical system as the load. Also there may be a battery disconnect with low voltage sensing such that the vehicle battery can be automatically disconnected from the vehicle electrical system when ignition is off and the battery is being drained (i.e. headlight accidently left on). In another alternative as a battery isolation relay between two separate vehicle battery systems, the assembly can connect the two together when either battery is being charged, and can isolate the electrical systems to prevent draining one battery from the second system. In this last alternative the controls on printed circuit board 18 sense battery voltages to automatically provide this function.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A vehicle battery relay assembly for disconnecting or isolating a vehicle battery from a connection line, comprising:
   a housing having a solenoid and a switch activated by the solenoid, the switch electrically connecting and disconnecting a first contact terminal for connection to the vehicle battery and a second contact terminal for connection to said connection line, said solenoid having a solenoid coil;
   a rotatable ratchet gear rotated by engagement with a pawl, said pawl being connected to a plunger of said solenoid;
   said switch comprising a contact element coupled to said ratchet gear, said contact element having at least first and second projecting contact points on said contact element; and
   said contact element being positioned relative to a respective contact surface of each of said first and second contact terminals such that given a first rotation of the contact element the first and second contact terminals are electrically connected and given a subsequent second rotation the first and second contact terminals are electrically disconnected.

2. The assembly of claim 1 wherein the contact element comprises a circular washer having first, second, third, and fourth bumps as said contact points projecting from a planar surface thereof.

3. The assembly of claim 1 wherein an insulating partial ring is provided beneath said contact element having first and second grooves therein at 180° spacing from each other relative to a center of said contact element.

4. The assembly of claim 3 wherein said ring comprises plastic and extends from a terminal surface of said housing between said first and second contact bolts.

5. The assembly of claim 3 wherein said ring comprises first and second V-shape grooves such that when an opposing pair of contact points are sitting on the contact bolts, the other opposing pair of contact points are hanging in free air adjacent said grooves.

6. The assembly of claim 1 wherein said ratchet gear comprises a plurality of teeth with grooves formed between the teeth and said pawl has a pawl head at one end and pivotably attached at a pivot point to said plunger at an opposite end, said pawl head being engagable in said grooves between said teeth of said ratchet gear.

7. The assembly of claim 1 wherein the ratchet gear has a circular base portion with teeth on said base portion.

8. The assembly of claim 6 wherein said pawl has a curved arm between said pivot point and said pawl head.

9. The assembly of claim 1 wherein a compression spring is provided between said contact element and said ratchet gear.

10. The assembly of claim 1 wherein a return spring is provided surrounding said plunger.

11. The assembly of claim 1 wherein said printed circuit board has a control circuit thereon electrically connected to said control signal terminal screw for disconnecting the vehicle battery from the vehicle load.

12. The assembly of claim 1 wherein said printed circuit board has a circuit thereon for isolating the vehicle battery from said another vehicle battery.

13. The assembly of claim 1 wherein said housing has a terminal surface and said first and second contact bolts and said terminal screws projecting outside the housing from said terminal surface.

14. The assembly of claim 1 wherein the first and second contact bolts at said respective contact surfaces each have a respective screw thread hole for receiving respective first and second printed circuit board retention screws, and said first, second, and third terminal screws also having respective screw thread holes therein receiving respective third, fourth, and fifth printed circuit board retention screws.

15. The assembly of claim 1 wherein said housing has a terminal surface and a removable housing base connecting to said housing opposite said terminal surface.

16. The assembly of claim 1 wherein said pawl has an integral spring member which keeps the pawl spring loaded against teeth of said ratchet gear.

17. The assembly of claim 1 wherein said pawl has an integral stop member which keeps the pawl, ratchet, and contact washer in a fixed position at the end of each plunger movement.

18. The assembly of claim 1 wherein said pawl has an integral spring member which provides an initial bending spring force and at an end of the spring member an end face which initially moves further with the spring member and then makes contact and slides along a portion of a surface of a main body of the pawl.

19. The assembly of claim 1 wherein a square shank protruding from the ratchet gear mechanically couples the ratchet gear to said contact element for rotary motion.

20. The assembly of claim 1 wherein the ratchet gear has a pocket and a mating surface of the ratchet gear pocket and a mating surface of a pin protruding from said base into said pocket are both provided with angled portions to maintain a pivot point of the ratchet gear on center during rotation.

21. A vehicle battery relay assembly for disconnecting or isolating a vehicle battery from a connection line, comprising:
   a housing having a solenoid and a switch activated by the solenoid, the switch electrically connecting and disconnecting a first contact bolt on said housing for connection to the vehicle battery and a second contact bolt on said housing for connection to said connection line, said solenoid having a solenoid coil;
   a printed circuit board in said housing electrically connected to said solenoid coil for control thereof;
   a rotatable ratchet gear rotated by engagement with a pawl, said pawl being connected to a plunger of said solenoid, said solenoid being a linear solenoid with linear motion of said plunger;
   said switch comprising a contact element coupled to said ratchet gear, said contact element having at least first and second projecting contact points on said contact element; and
   said contact element being positioned relative to a contact surface of said first and second contact bolts such that given a first rotation of the contact element an electrical connection is established between the first and second contact bolts and given a second rotation the first and second contact bolts are electrically disconnected.

22. A vehicle battery relay assembly for disconnecting a vehicle battery from a vehicle load or for isolating from another vehicle battery, comprising:
   a housing having a solenoid and a switch activated by the solenoid, the switch electrically connecting and disconnecting a first contact bolt on said housing for connection to the vehicle battery and a second contact bolt on said housing for connection to said vehicle load or said another vehicle battery, said solenoid having a solenoid coil with first and second leads;

a printed circuit board in said housing connected to said first and second leads of said solenoid coil for control thereof by a control circuit on said printed circuit board;

first and second control signal terminal screws on said housing connected to said printed circuit board and a power terminal screw on said housing also connected to said printed circuit board;

a rotatable ratchet gear rotated by engagement with a pawl, said pawl being connected to a plunger of said solenoid;

said switch comprising a contact element coupled to said ratchet gear, said contact element having first, second, third, and fourth projecting contact points on said contact element at spaced 90° positions from each other relative to a center of said contact element; and said contact element being positioned relative to a contact surface of said first and second contact bolts such that given a 45° rotation of the contact element the first and second contact bolts are electrically connected and given a subsequent 45° rotation the first and second contact bolts are electrically disconnected.

\* \* \* \* \*